United States Patent [19]

Hanma et al.

[11] 3,990,107
[45] Nov. 2, 1976

[54] CIRCUIT FOR AUTOMATICALLY CONTROLLING HORIZONTAL SCANNING FREQUENCY

[75] Inventors: Kentaro Hanma, Yokohama; Michio Masuda, Tokyo; Katsuo Mohri, Yokohama, all of Japan

[73] Assignee: Hitachi, Ltd., Japan

[22] Filed: Feb. 26, 1975

[21] Appl. No.: 553,116

[30] Foreign Application Priority Data
Mar. 2, 1974 Japan .................................. 49-24610

[52] U.S. Cl. .................................. 360/37; 360/11; 360/36; 360/10
[51] Int. Cl.² .................................. H04N 5/795
[58] Field of Search .................. 360/37, 11, 36, 34, 360/35, 10

[56] References Cited
UNITED STATES PATENTS
3,573,357  4/1971  Toce ..................................... 360/37
3,732,362  5/1973  Kinjo ..................................... 360/37
3,886,589  5/1975  Nasu ..................................... 360/11
3,887,941  6/1975  Dann ..................................... 360/37

Primary Examiner—Daryl W. Cook
Assistant Examiner—Alan Faber
Attorney, Agent, or Firm—Craig & Antonelli

[57] ABSTRACT

A circuit for automatically controlling horizontal scanning frequency, used in the horizontal deflecting circuit of a display device which displays a still picture by repeatedly reading television signal for a single field stored in a field memory. The automatic frequency control circuit comprises a circuit for generating two horizontal sync signals which are 180° out of phase from each other and a circuit for changing over the two signals at a period of the single field. Thus, a proper sequence of odd and even fields is obtained.

4 Claims, 4 Drawing Figures

CIRCUIT FOR AUTOMATICALLY CONTROLLING HORIZONTAL SCANNING FREQUENCY

BACKGROUND OF THE INVENTION

1. Field of the Invention

This invention relates to a device for reproducing a still picture and more particularly to the deflecting circuit of a reproducing device for obtaining a still picture by extracting a signal portion corresponding to a single field from the interlaced scanning television signal, by storing the extracted signal portion, and by repeatedly reading the stored signal.

2. Description of the Prior Art

Today, in the U.S., Japan etc., the exclusive television signal used in broadcasting is of interlaced scanning. In such a signal system, the period of one frame is chosen to be an odd multiple of a horizontal scanning period so that the horizontal sync signal may be received by the receiver every horizontal scanning period. Accordingly, in the television receiver adapted for the standardized television signal, the horizontal deflecting current in synchronism with the transmitted horizontal sync signal can be obtained by comparing the received horizontal sync signal with the horizontal flyback pulses produced by the horizontal deflecting circuit by means of a phase detector and by controlling the horizontal oscillator with the output of the phase detector. This means for obtaining the horizontal deflecting current is referred to as a horizontal automatic frequency control circuit (also referred to for brevity as horizontal AFC circuit).

Since the fluctuation of the horizontal repetition frequency of the television signal now used in broadcasting is rendered very small, the ac loop gain of the horizontal AFC circuit of the TV receiver can be chosen to be small. Accordingly, the noise band width can be made so small and therefore the S/N ratio can be improved.

Recently, a recording and reproducing device is widely used which displays a still picture by storing a signal portion corresponding to one scene of television signal and by iteratively reading the stored signal portion. In a device for recording and reproducing a still picture, a magnetic disc or the like which is rotated through 360° for the period of scanning one frame or field, is used and the disc stores the television signal portion for one frame or field. In case where a signal portion corresponding to a single shot is extracted from the television signal representing a picture in motion and then stored, the signal portion most often covers a single field. If a signal portion corresponding to one frame of the television signal representing pictures in rapid motion, for which the television signal is different from field to field, is used to reproduce a still picture, then the reproduced picture will have double outlines which degrades the picture quality very. With the signal portion corresponding to one field, the vertical resolution will be degraded since the number of the scanning lines is decreased, but there is no double outline. Therefore, a field memory which stores a one-field signal (a signal portion corresponding to one field of the television signal) and from which the one-field signal is iteratively read out, is exclusively used in practice.

However, the horizontal AFC circuit used in an ordinary television receiver cannot be applied directly to a device for displaying the reproduced signal from the field memory. The reason is as follows. In the interlaced scanning system, the period of one frame is an odd multiple of one horizontal scanning period. The period of one field is, therefore, an integral multiple and a half of the horizontal scanning period. If a one-field signal is repeatedly read, there will be a difference of one half the horizontal scanning period, i.e. phase difference of 180°, between the starting points of the adjacent output signals. In order to reproduce a proper picture, the horizontal deflecting current must swiftly response to the phase shift of 180° taking place every output. The HAFC circuit of an ordinary television receiver requires rather a long time (about 1/120 second, i.e. one half the period of a field) to cause the horizontal deflecting current to be synchronized with the sync signal under the existence of the phase shift. This means that about a half of the original picture is not properly reproduced, that is, the upper half of the reproduced picture flows horizontally.

SUMMARY OF THE INVENTION

One object of the present invention is to provide a horizontal deflecting circuit suitable for the display device used in a still picture recording and reproducing device.

Another object of the present invention is to provide a horizontal automatic frequency control circuit suitable for a display device for displaying the output of a field memory.

Still another object of the present invention is to provide a horizontal automatic frequency control circuit for a display device which can properly display even a video signal having a phase shift of a half of horizontal scanning period from field to field.

The feature of the present invention, which has been made to attain the above objects, is that two horizontal sync signals having a phase difference of 180° with respect to each other are produced and that the two signals are switched over from field to field and applied to a drive circuit for horizontal deflection.

DESCRIPTION OF THE PREFERRED EMBODIMENT

Figure 1:
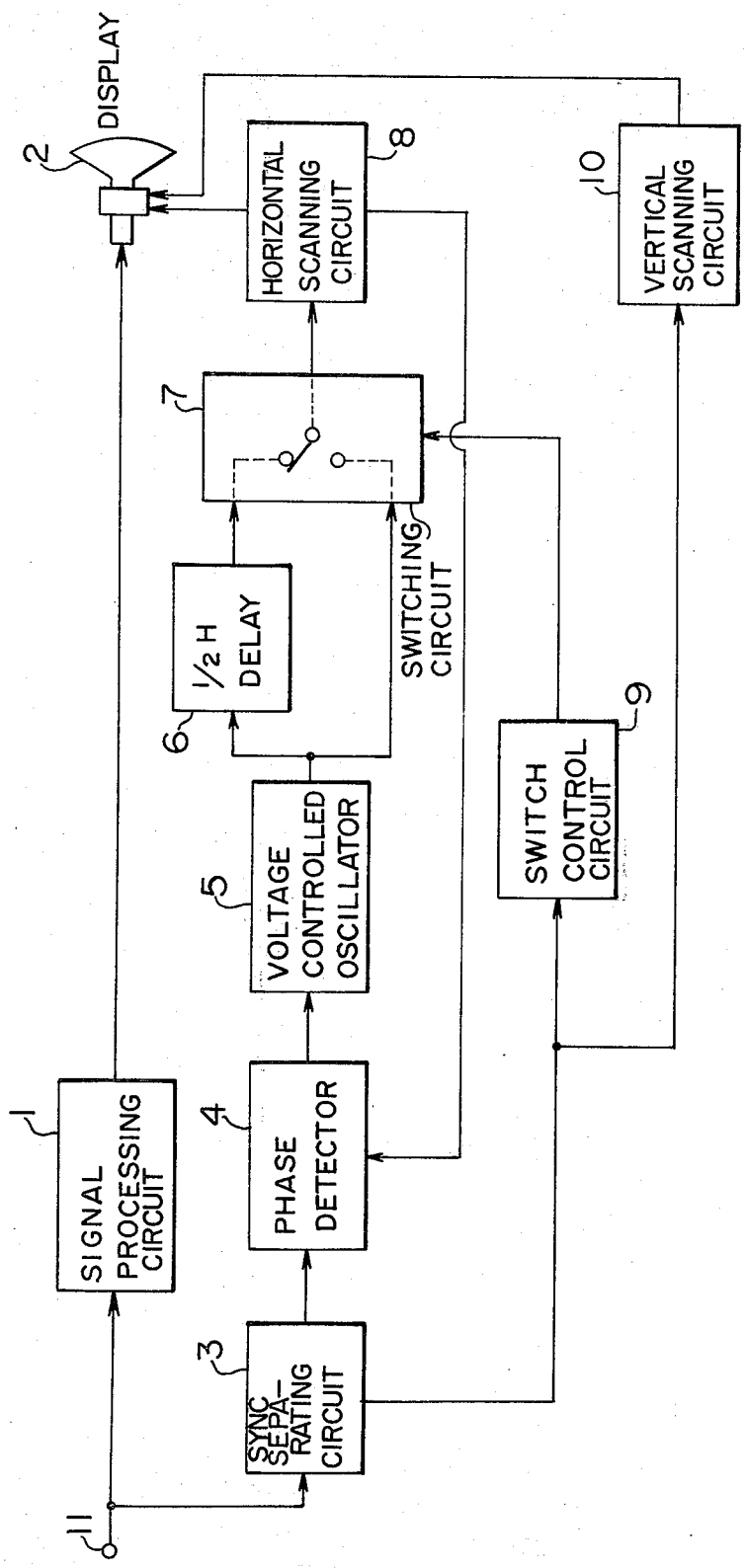
FIG. 1 is a block diagram of one embodiment of the present invention.

FIG. 1 shows in block diagram an embodiment of the present invention. A signal portion corresponding to one field, i.e. one-field signal, is extracted from the standard television signal and stored in a field memory (not shown), and the output as a result of repeated reading of the one-field signal is delivered. The output of the field memory is applied to an input terminal 11. The signal received at the terminal 11 is then fed to a signal processing circuit 1 and a sync separating circuit 3. The signal processing circuit 1 can have the same circuit configuration as the video signal processing circuit used in an ordinary television receiver. In case of treating a color video signal, such a color signal treating circuit as used in an ordinary color TV receiver is also incorporated. The output signal of the signal processing circuit 1 is fed to a display device 2 such as a cathode ray tube to produce a picture.

The sync separating circuit 3 has the same circuit configuration as the sync separating circuit used in an ordinary TV receiver. Of the sync signals separated by the sync separating circuit 3, the vertical sync signal is applied to a vertical scanning circuit 10 to scan the display device vertically in timing with the video signal applied to the input terminal 11. The horizontal sync signal from the sync separating circuit 3 is applied to one of the inputs of a phase detector 4. The other input terminal of the phase detector 4 receives flyback pulses produced by a horizontal scanning circuit 8. The phase detector 4 compares the phase of one input signal with that of the other and delivers a control voltage in accordance with the phase difference between the two input signals. The control voltage is applied to a voltage controlled oscillator 5 which operates, just as the horizontal AFC circuit in an ordinary television receiver does, in such a manner that the phase of the output of the voltage controlled oscillator 5 coincides with the input horizontal sync signal.

The feature of this embodiment is the path for supplying the output of the voltage controlled oscillator 5 for the horizontal scanning circuit 8. Namely, the output of the voltage controlled oscillator 5 is branched: one is applied to one of the inputs of a switching circuit 7 through a delay element 6 having a delay time equal to one half of the horizontal scanning period while the other is applied directly to the other input of the switching circuit 7. The switching circuit 7 selectively delivers one of the two inputs and the selected signal is applied to the horizontal scanning circuit 8. The selective operation of the switching circuit 7 is controlled by the output signal from a switch control circuit 9. The switch control circuit 9 receives the vertical sync signal separated by the sync separating circuit 3 and controls the switching circuit 7 in such a manner that the two input signals to the circuit 7 are changed over and delivered from field to field in synchronism with the vertical sync signal. The switching circuit 7 can be constituted of two AND gates each having two inputs. The switch control circuit 9 is exemplified by a flip-flop circuit which is inverted each time an input pulse is applied. In this case, the two outputs of the flip-flop circuit are connected with the respective ones of the input terminals of the two AND gates while the others of the input terminal of the AND gates receive the output of the voltage controlled oscillator 5 and the output of the delay element 6, the outputs of the two AND gates being applied to the horizontal scanning circuit 8.

Since the switch control circuit 9 to control the change-over operation of the switching circuit 7 is driven by the vertical sync signal contained in the video signal received at the input terminal 11, the phase of the horizontal sync signal for reproduction supplied for the horizontal scanning circuit 8 shifts by half the horizontal scanning period, i.e. 180°, each time the field is renewed. Accordingly, the phase of the video signal applied to the input terminal 11 and the phase of the horizontal deflecting current as the output of the horizontal scanning circuit 8 simultaneously shift by half the horizontal scanning period each time the field is renewed. Thus, there is almost no phase difference between the two inputs of the phase detector 4 so that the voltage controlled oscillator 5 can continue to oscillate stably. Since the horizontal deflecting current obtained from the horizontal scanning circuit 8, like the video signal through the signal processing circuit 1, shifts by a phase equal to half the horizontal scanning period, a proper picture is always displayed on the display device 2.

Figure 2:
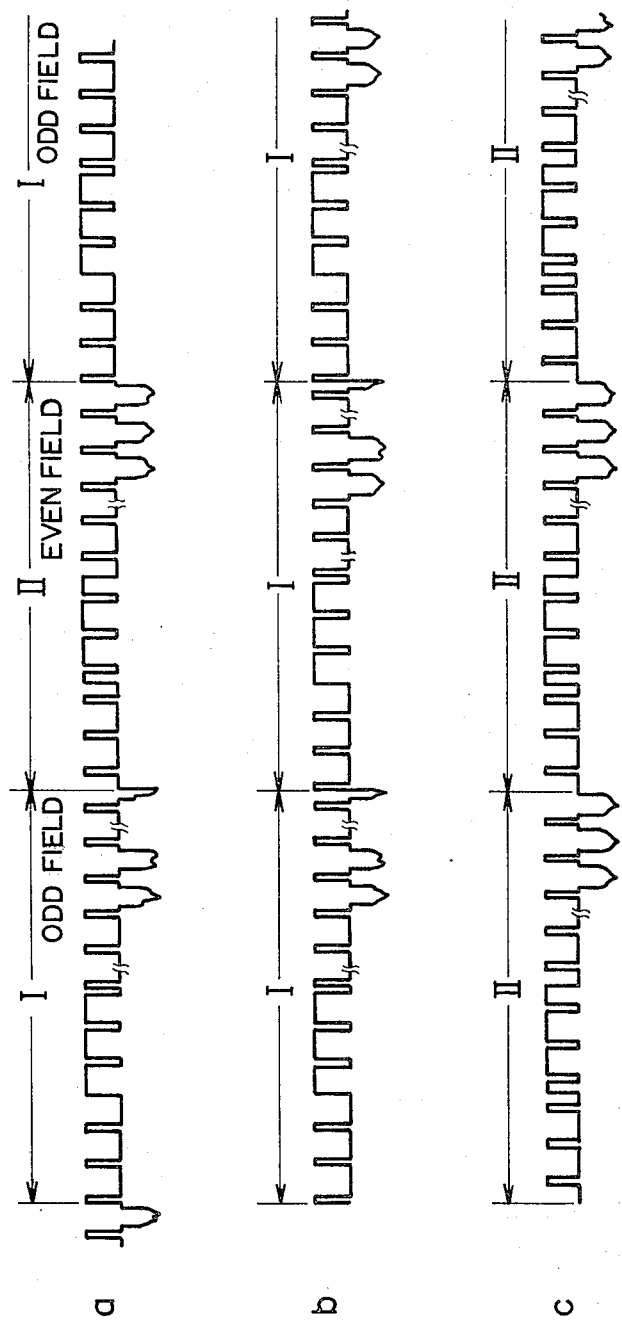
FIG. 2 shows the waveforms of an ordinary television signal and the associated signal portions.
Figure 3:
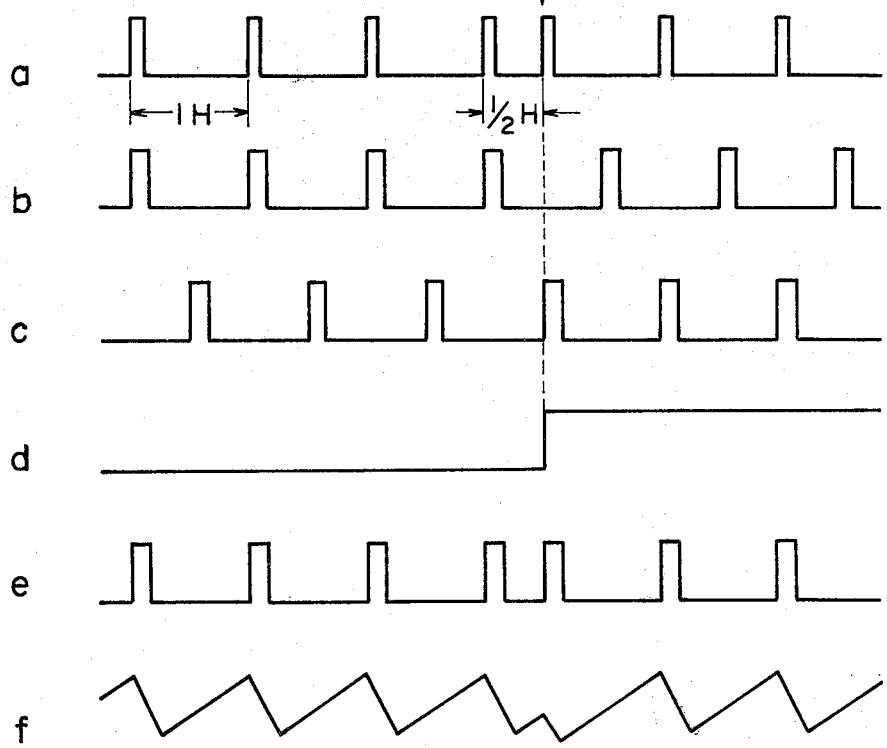
FIG. 3 shows the waveforms of signals useful for explaining the operation of the circuit shown in FIG. 1.

The description of the invention will be further detailed with the aid of the signal waveforms shown in FIGS. 2 and 3. FIG. 2a schematically shows an ordinary television signal, in which the successive fields are identified as the field periods I and II corresponding respectively to the odd and the even fields. Every field contains a fractional period equal to half the horizontal scanning period, but the horizontal synchronizing pulses appear at regular intervals. If a one-field signal is extracted from the television signal and stored in a field memory and the stored one-field signal is iteratively read, then the waveforms as shown in FIGS. 2b and 2c are obtained. FIG. 2b corresponds to the case where the odd field is extracted and FIG. 2c to the case where the even field is iteratively reproduced. As seen from the figures, in both the cases, a phase shift equal to half the horizontal scanning period occurs between the end of one field and the beginning of the next field. Now, the operation of the embodiment shown in FIG. 1 will be described with the aid of FIG. 2b where the odd field is repeated. FIG. 3 shows the horizontal sync signal obtained in this case from the sync separating circuit 3, in which the horizontal sync pulses near the point at which the field is renewed are depicted on an enlarged scale, the mark * indicating the point of field renewal. The output signal of the voltage controlled oscillator 5 has such a waveform as shown in FIG. 3b and if the signal shown in FIG. 3b is passed through the delay element 6, the waveform shown in FIG. 3c is obtained. The output signal of the switch control circuit 9 is as shown in FIG. 3d. Before the point of time indicated by the mark *, the switching circuit 7 causes the output of the voltage controlled oscillator 5 as shown in FIG. 3b to be supplied directly to the horizontal scanning circuit 8. On the other hand, after that point, the switching circuit 7 causes the output of the delay element 6 as shown in FIG. 3c to be applied to the horizontal scanning circuit 8. Accordingly, the overall signal applied to the horizontal scanning circuit 8 has such a waveform as shown in FIG. 3e which coincides completely with that of the input horizontal sync signal shown in FIG. 3a. As a result, the horizontal deflecting current has such a waveform as shown in FIG. 3f so that a proper picture can be displayed on the display device 2 even though the one-field signal has a fraction of the horizontal scanning period.

Whether the switching circuit 7 initially delivers an output signal as shown in FIG. 3b or an output as shown in FIG. 3c, depends on chance. So, there will be a case where the horizontal sync signal for reproduction initially applied to the horizontal scanning circuit 8 is 180° out of phase with respect to the sync signal contained in the video signal applied to the terminal 11. Even in such a case, however, through the automatic frequency control operation by the phase detector 4, the phase of the output signal of the voltage controlled oscillator 5 is corrected within the period of one field and rendered coincident with that of the input sync signal, so that only the first one field of the reproduced picture is disturbed, no practical inconvenience being left.

Figure 4:
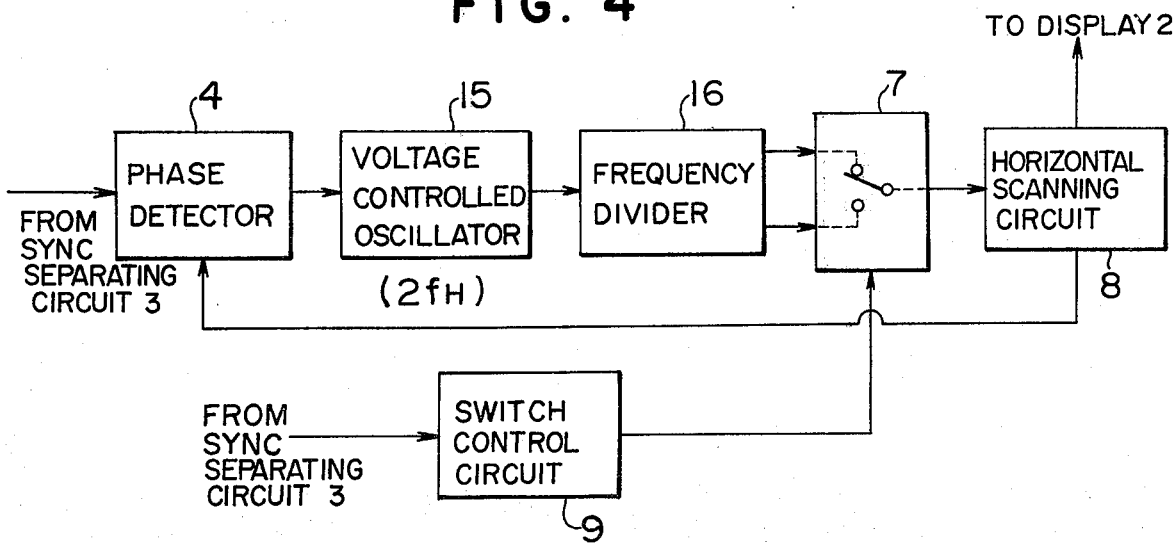
FIG. 4 is a block diagram of a principal portion of another embodiment of the present invention.

FIG. 4 shows in block diagram a principal portion of another embodiment of the present invention. The same reference numerals indicate like parts or circuit elements as in FIG. 1. The difference of this embodiment from that shown in FIG. 1 is that the oscillation frequency of the voltage controlled oscillator 15 is double the horizontal scanning frequency and that two horizontal sync signals for reproduction 180° out of phase relative to each other are produced by the use of a frequency divider 16 which halves the frequency of the input signal thereto.

The frequency divider 16 can be constituted of a conventional flip-flop circuit. In such a case, the output of the frequency divider 16 is a pulse signal having a duty ratio of 50% and it is preferable to narrow the width of each pulse by a waveform shaping circuit connected at the output side of the frequency divider 16 so as to obtain a waveform adapted to be applied to the horizontal scanning circuit 8. The two horizontal sync signal for reproduction having 180° different phases delivered from the frequency divider 16, are applied through the switching circuit 7 controlled by the switch control circuit 9 to the horizontal scanning circuit 8 in the same manner as described above. Accordingly, as in the preceding embodiment, the horizontal sync signal for reproduction which swiftly responds to the phase shift each field has, can be obtained so that the signal repeatedly read out of the field memory can be stably displayed.

In the embodiments shown in FIGS. 1 and 4, the phase difference between the two horizontal sync signals for reproduction need not be equal exactly to 180°. In case where the difference is not 180°, the phase of the output of the voltage controlled oscillator 5 or 15 is automatically corrected since the output of the horizontal scanning circuit 8 is fed back to the phase detector 4.

The foregoing description is devoted only to the case where a single field is recorded and repeatedly read for reproduction of a still picture, but it is also possible to apply the present invention to a multiple channel recording and reproducing apparatus in which a plurality of field are simultaneously recorded and reproduced. In such a case, however, all the signals to be recorded and reproduced should be of the odd or even field and the odd and even field signals should not be mixed. In this way, the function according to the present invention can be directly brought into play even in case where the signals are successively or sporadically reproduced over the entire channels.

We claim:
1. A horizontal deflecting circuit for a display device, having a horizontal scanning circuit, which displays a still picture by receiving a video signal which has been obtained by repeatedly reading out a signal stored in a memory and corresponding to a single field derived from an interlaced scanning television signal, said video signal including a horizontal sync signal having its phase shifted by 180° with every field of the video signal, comprising:
means for separating the horizontal sync signal and a vertical sync signal from the video signal;
phase detecting means for comparing the phase of the separated horizontal sync signal with the phase of flyback pulses obtained from the horizontal scanning circuit to produce a control signal in accordance with a difference between the phases;
means, controlled by the control signal, for producing two signals which are out of phase by 180° to each other, each having a frequency equal to the horizontal scanning frequency; and
means for alternately applying said two signals to the horizontal scanning circuit every field of the video signal in synchronism with the separated vertical sync signal.

2. A horizontal deflecting circuit as claimed in claim 1, wherein said two signal producing means comprises:
a voltage controlled oscillator wherein the oscillation frequency is controlled by said control signal produced by the phase detecting means to produce an output signal having a frequency equal to the horizontal scanning frequency;
delay means for delaying the output signal of the voltage controlled oscillator by a period of time substantially equal to one half of the horizontal scanning period of time; and
two output terminals for delivering the output signal of the voltage controlled oscillator and an output signal of the delay means, respectively.

3. A horizontal deflecting circuit as claimed in claim 1, wherein said two signal producing means comprises:
a voltage controlled oscillator wherein the oscillation frequency is controlled by said control signal produced by the phase detecting means to produce an output signal having a frequency equal to double the horizontal scanning frequency; and
a frequency dividing means receiving the output signal of the voltage controlled oscillator as a trigger signal for generating a first signal having a frequency equal to one half of that of the received output signal and a second signal corresponding to a phase inverted version of the first signal.

4. A horizontal deflecting circuit for a display device, having a horizontal scanning circuit, which displays a still picture by receiving a video signal which has been obtained by repeatedly reading out a signal stored in a memory and corresponding to a single field derived from an interlaced scanning television signal, said video signal including a horizontal sync signal having its phase shifted by 180° with every field of the video signal, comprising:
means for separating the horizontal sync signal and a vertical sync signal from the video signal;
phase detecting means for comparing the phase of the separated horizontal sync signal with the phase of flyback pulses obtained from the horizontal scanning circuit to produce a control signal in accordance with a difference between the phase;
means, controlled by the control signal, for producing two signals which are out of phase by 180° to each other, each having a frequency equal to the horizontal scanning frequency;
switching means for switching said two signals to alternately deliver one of said two signals to the horizontal scanning circuit; and
switch controlling means for controlling the switching means with the separated vertical sync signal so that said two signals are alternately applied to the horizontal scanning circuit every field of the video signal in synchronism with the separated vertical sync signal.

* * * * *